United States Patent
Horikawa

[11] Patent Number: 5,995,494
[45] Date of Patent: Nov. 30, 1999

[54] DATA COMMUNICATION USING NETWORK DCE AND MODIFIED CHANNEL ASSOCIATED SIGNALING

[75] Inventor: Kiyotaka Horikawa, Tokyo, Japan

[73] Assignee: NEC Corporation, Tokyo, Japan

[21] Appl. No.: 08/896,028

[22] Filed: Jul. 17, 1997

[30] Foreign Application Priority Data

Jul. 17, 1996 [JP] Japan ..................................... 8-205520

[51] Int. Cl.$^6$ .............................. H04B 7/00; H04H 1/10; H04L 5/22
[52] U.S. Cl. ........................................... 370/310; 370/360
[58] Field of Search ..................................... 370/310, 313, 370/328, 329, 336, 337, 347, 348, 360, 384, 431

[56] References Cited

U.S. PATENT DOCUMENTS

| | | | |
|---|---|---|---|
| 4,890,303 | 12/1989 | Bader | 375/356 |
| 5,726,764 | 3/1998 | Averbuch et al. | 358/403 |
| 5,784,633 | 7/1998 | Petty | 375/200 |
| 5,790,800 | 8/1998 | Gauvin et al. | 709/227 |

*Primary Examiner*—Hassan Kizou
*Assistant Examiner*—Saba Tsegaye
*Attorney, Agent, or Firm*—Foley & Lardner

[57] ABSTRACT

In a data communication system, the controller of a mobile switching center is initially responsive to a request message from a mobile user for supplying a single-bit setup message to an interworking unit via a signaling channel exclusively associated with a data channel. In response, the interworking unit activates an associated network DCE within the mobile switching center and returns a single-bit first response message to the controller. In response, the controller returns an ACK message to the mobile user to allow the data channel to be established between the mobile user and the local DCE. When the data channel is established, the interworking unit returns a single-bit second response message to the controller to allow the data channel to extend to a destination DCE and allow handshaking to proceed between the network DCE and the destination DCE via the interworking unit, using the network DCE as a local DCE of the mobile user.

18 Claims, 6 Drawing Sheets

DATA COMMUNICATION USING NETWORK DCE AND MODIFIED CHANNEL ASSOCIATED SIGNALING

BACKGROUND OF THE INVENTION

1. Field of the Invention

The present invention relates generally to data communication systems, and more specifically to data communication using a network DCE and a channel-associated signaling scheme. The present invention is particularly suitable for mobile computing using a cellular telephone.

2. Description of the Related Art

In conventional mobile data communication systems, the data circuit-terminating equipment (DCE) for a mobile use end system is located within the mobile switch center (or mobile telephone switching office) to serve as a local DCE, whereas fixed user end systems usually have their own DCE within the premises of the fixed users. An interworking unit is therefore provided in the mobile switching center for performing interworking operations between the local DCE and a destination DCE. The mobile switching center has a signaling controller that provides switching and signaling functions. The signaling controller is connected to the interworking unit via time-division multiplexed signaling channels associated respectively with time-division multiplexed data channels.

When a mobile user end system sends a REQUEST message to the mobile switching center, the signaling controller applies a SETUP message to the interworking unit to activate the local DCE. However, the signaling message of the channel-associated signaling is represented by a single bit, and there is no response message for the setting-up of the DCE. Therefore, the signaling controller would have to wait a longer period of time to return an acknowledgment than would be necessary. In addition, the local DCE must be set with parameters from the local mobile user. However, there is no response message for the parameter setting process. As a result, no data service is satisfactorily provided with the current data communication system where the channel-associated signaling scheme is used between the signaling controller and the interworking unit for controlling the local DCE.

SUMMARY OF THE INVENTION

It is therefore an object of the present invention to enable end-to-end data communication to be established using a network DCE by modifying the channel-associated signaling between a signaling controller and an interworking unit for controlling the DCE.

According to a first aspect of the present invention, there is provided a data communication system comprising a user end system, a controller, a local data circuit-terminating equipment (DCE), and an interworking unit for establishing communication between the local DCE and a destination DCE, the interworking unit being connected to the controller a signaling channel. The controller is initially responsive to a request message from the user end system for producing a single-bit setup message. The interworking unit is responsive to the setup message for setting up the local DCE and returning a single-bit first response message to the controller. The controller is responsive to the first response message for returning an acknowledgment message to the user end system to allow a data channel to be established between the user end system and the local DCE, the data channel being exclusively associated with the signaling channel. The interworking unit is further responsive to the establishment of the data channel for returning a single-bit second response message to the controller to allow the data channel to extend to the destination DCE.

According to a further aspect, the present invention provides a data communication system comprising first and second user end systems, a controller, first and second DCEs, and first and second interworking units for establishing communication between the first DCE and the second DCE. The first and second interworking units are connected to the controller via first and second signaling channels, respectively. The controller is responsive to a first request message from the first user end system for producing a single-bit first setup message. The first interworking unit is responsive to the first setup message for setting up the first DCE and returning a single-bit first response message to the controller. The controller is responsive to the first response message for returning an acknowledgment message to the first user end system to allow a first data channel to be established between the first user end system and the first DCE, the first data channel being exclusively associated with the first signaling channel. The first interworking unit is further responsive to the establishment of the first data channel for returning a single-bit second response message to the controller for alerting the second user end system, and the controller is further responsive to a second request message from the second use end system for producing a single-bit second setup message. The second interworking unit is responsive to the second setup message for set up the second DCE and returning a single-bit third response message to the controller. The controller is responsive to the third response message for returning an acknowledgment message to the second user end system to allow a second data channel to be established between the second user end system and the second DCE, the second signaling channel being exclusively associated with the second data channel. The second interworking unit is further responsive to the establishment of the second data channel for returning a single-bit fourth response message to the controller to allow data to flow between the first and second user end systems over the first and second data channels.

BRIEF DESCRIPTION OF THE DRAWINGS

The present invention will be described in further detail with reference to the accompanying drawings, in which.

DETAILED DESCRIPTION

Figure 1:
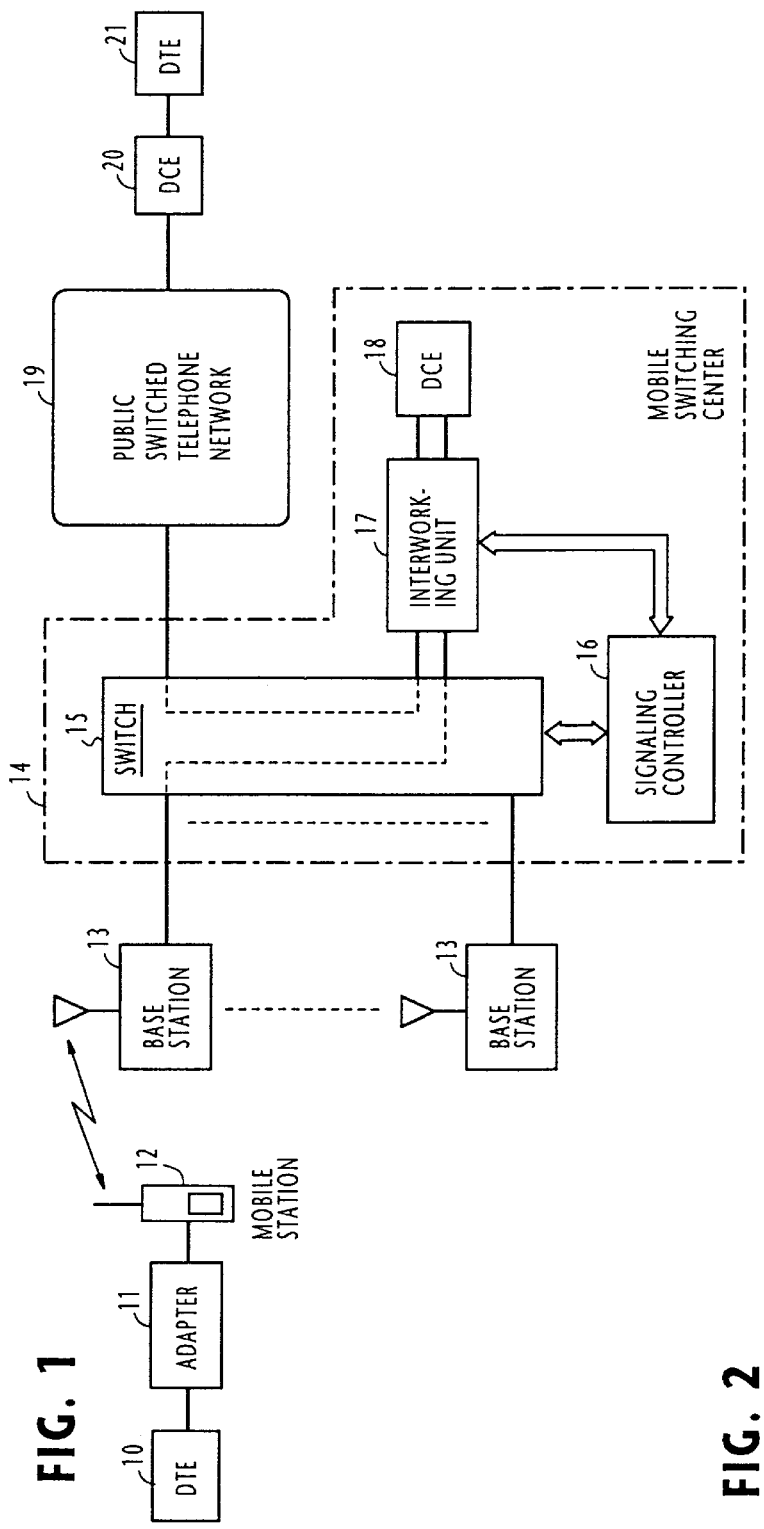
FIG. 1 is a block diagram of a data communication system between a mobile station and a fixed DCE according to the present invention.

Referring now to FIG. 1, a mobile data communication system according to one form of the present invention is illustrated. In the illustrated configuration, a known cellular telephone, or mobile station 12 establishes a radio link with a nearby cell-site station, or base station 13. A plurality of such base stations 13 are connected to a mobile switching center (mobile telephone switching office) 14, which is connected to a public switched telephone network 19. A remote user end system is connected to the PSTN. This user end system is a fixed system comprising a remote data circuit-terminating equipment (DCE) 20 and a data terminal equipment (DTE) 21.

The mobile switching center 14 includes a time-division switch 15, a signaling controller 16, an interworking unit 17 and a DCE 18. All base stations 13 are terminated at the switch 15 with which the signaling controller 16 is associated to perform switching and signaling functions on all incoming calls from and outgoing calls to the base stations 13. The signaling controller 16 is also connected to the interworking unit 17 via time-division multiplexed signaling channels associated respectively with time-division multiplexed data channels. The interworking unit 17 provides interworking between the DCE 18 and the remote DCE 21 to facilitate handshaking therebetween.

A local DTE 10 is attached through an adapter 11 to mobile station 12 to establish a data communication path to the remote DTE 21 according a to specified protocols. DTE 10, adapter 11 and mobile station 12 constitute a mobile user end system.

Figure 2:
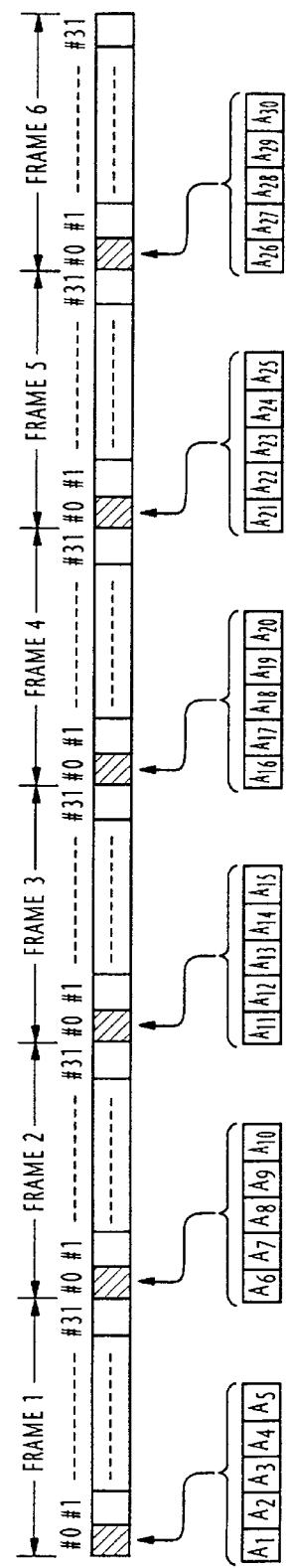
FIG. 2 is a schematic illustration of the format of signaling bits used between a signaling controller and an interworking unit.

When the data communication path is established, the interworking unit 17 and DCE 18 are connected between the base station 13 and the PSTN 19 through a path established in the digital switch 12. In this configuration, the DCE 18 operates as a local DCE for the mobile station 12. The interworking unit 17 has a radio interface circuit for interfacing the local DCE to the mobile station and a signaling interface circuit for interfacing between the signaling controller 16 and the remote DCE, as well as between the local and remote DCEs. These interface circuits are digital circuits using a 2.048 Mbps time-division multiplex format. According to this format, thirty-two 8-bit time slots are accommodated in each of 256-bit frames and time slot #0 of each free is exclusively used for carrying the signaling messages of data time slots #1 to #15 and #17 to #31 (note that data slot #16 is not used). Among the six-four signaling bits that can be carried by eight frames #0 to #7, thirty bits arm used to exchange four messages (SETUP, SETUP COMPLETE, PROCEED-TO-SEND, DISCONNECT and DISCONNECT COMPLETE) between the signaling controller and the interworking unit for each of thirty data slots. These messages are represented by an Ax bit, where w=1, 2 . . . , 30 identifying the data slots #1 to #30. These thirty Ax signaling bits are assembled into six groups and these groups are respectively carried by six frames #1 to #6, a illustrated in FIG. 2, with frames #0 and #7 carrying other signaling messages.

Figure 3:
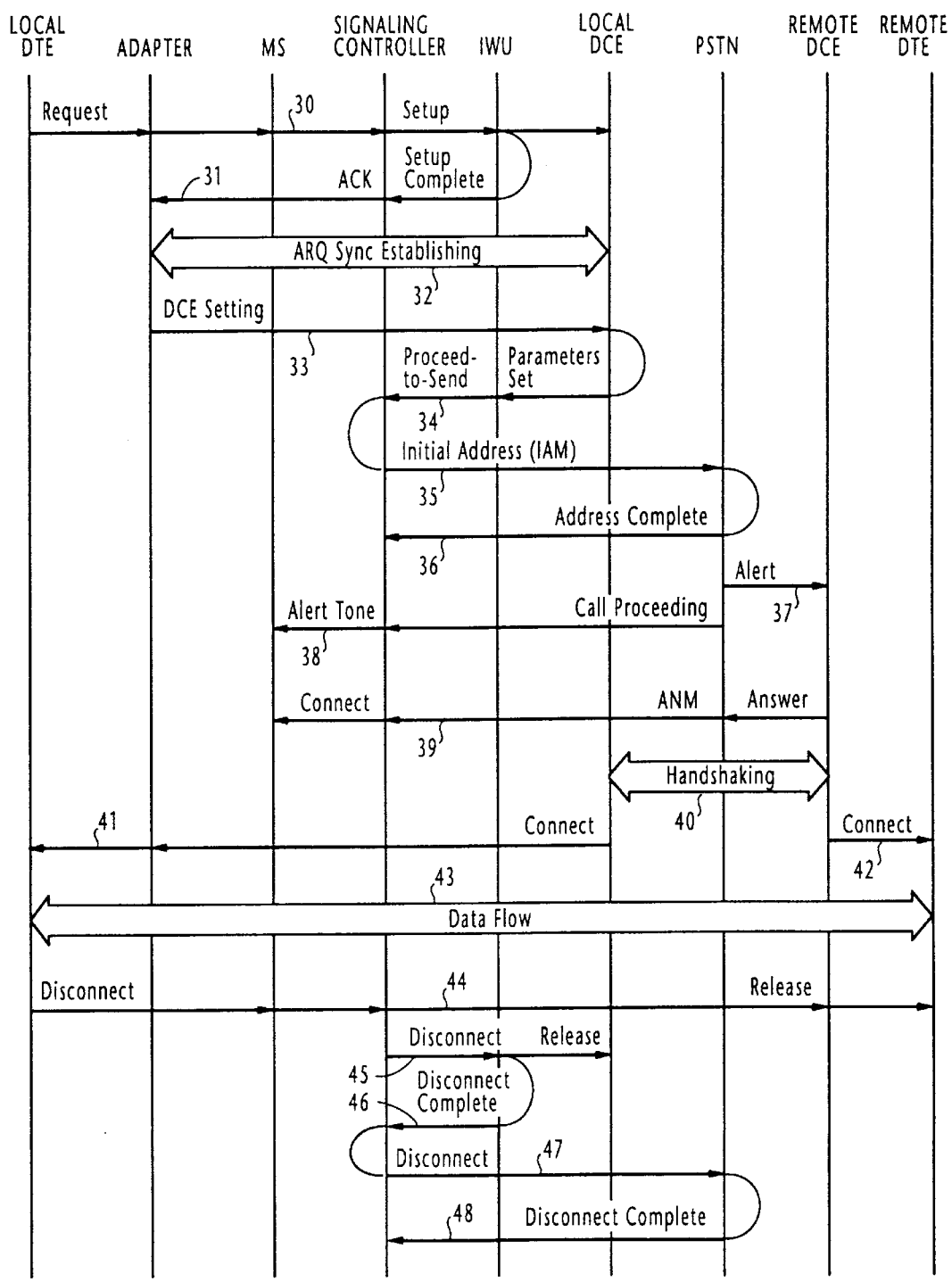
FIG. 3 is a sequence diagram illustrating a sequence of various message transmitted through the system of FIG. 1.

A sequence of events that occur between local DTE 10 and remote DTE 21 is illustrated in FIG. 3. When the local DTE sends a REQUEST message, it is relayed by adapter 11 and mobile unit 10 to the mobile switching center 14, where the signaling controller 16 responds to it by supplying 2 SETUP message to the interworking unit 17 so that the local DCE 18 is activated (step 30). Interworking unit 17 returns a SETUP COMPLETE message to the signaling controller 16, which, in response, returns an ACK (acknowledgment) message to the adapter 11 (step 31). Automatic repeat request (ARQ) sync timing is then established between the adapter 11 and the local DCE 18 (step 32) and DCE setting is initiated by the adapter 11 by setting parameters into the local DCE 18 (step 33). When the DCE setting is complete, the interworking unit 17 applies a PROCEED-TO-SEND message to the signaling controller 16 (step 34). In response, the signaling controller 16 forwards an initial address message (IAM) to the PSTN (step 35).

If the destination is available the PSTN returns an address complete message to the signaling controller 16 (step 36) and alerts the remote DCE (step 37), while returning a call proceeding message to the signaling controller indicating a status of the call. In response, the signaling controller sends an alert tone to the mobile station 12 (step 38). When the remote DCE 20 answers the alert signal, the PSTN returns an answer message (ANM) to the signaling controller 16, which responds by sending a CONNECT indication to the mobile station (step 39). Handshaking between the local and remote DCEs begins to establish synchronization and transmission speed (step 40). When the handshaking is successful, the local and remote DCEs send a CONNECT message to the local and remote DTEs, respectively (steps 41, 42). A session of data flow occurs between the local and remote DTEs (step 43).

When the session ends, the local DTE applies a DISCONNECT message to the adapter 11. This message is successively relayed to the remote DCE and DTE as well as to the interworking unit via the signaling controller (steps 44, 45) which responds thereto by releasing the local DCE and returning a DISCONNECT COMPLETE message (step 46) to the signaling controller. The signaling controller then forwards a DISCONNECT message to the PSTN (step 47), resulting in the PSTN clearing the established connection and returning a DISCONNECT COMPLETE message (step 48).

Figure 4:
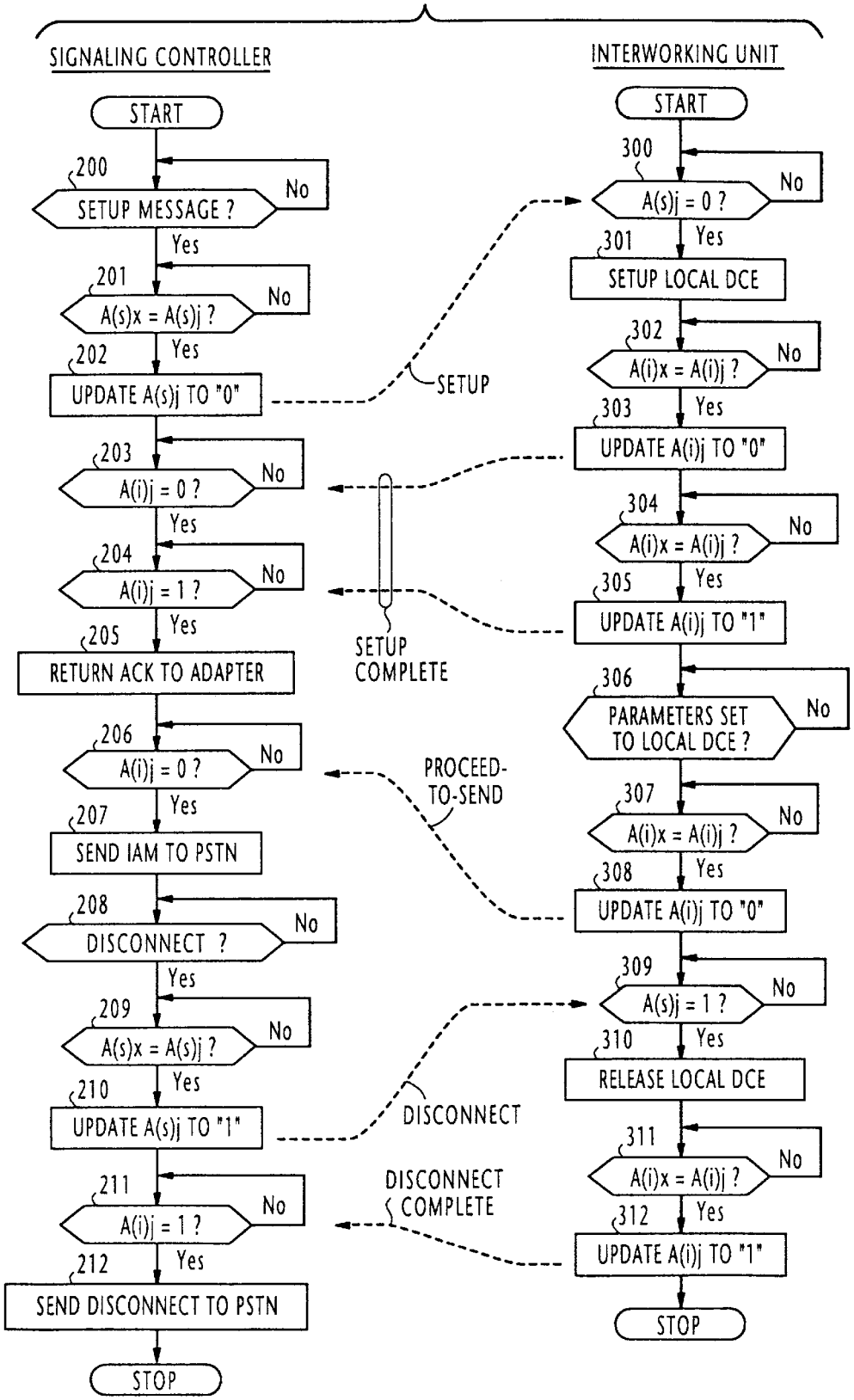
FIG. 4 is a flowchart of the operation of the signaling controller and the interworking unit.
Figure 5:
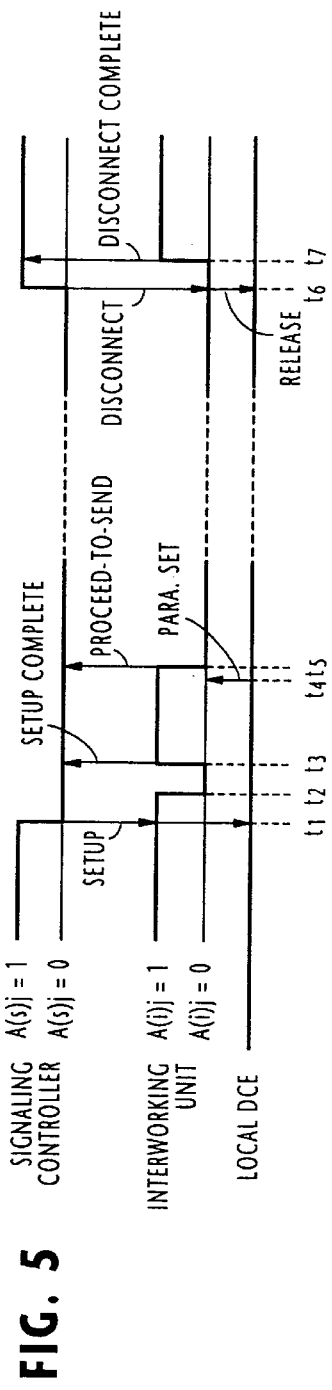
FIG. 5 is a timing diagram of the operation of the signaling controller and the interworking unit.

The operation of signaling controller 16 and interworking unit 17 for a given data channel (time slot) will be explained in detail below with the aid of FIGS. 4 and 5 together with the sequence diagram of FIG. 3 by assuming that the associated signaling channel number of the given data channel is "j" and the signaling bit sent from the signaling controller to the interworking unit for the channel "j" is represented as A(s)j and that sent for the channel "j" from the interworking unit to the signaling controller is represented as A(i)j. Both of the signaling bits are initially set equal to binary "1".

When signaling controller 16 receives a SETUP message from the mobile station 12 (step 200). It proceeds to step 201 to check to see if the transmit timing A(s)x is equal to A(s)j. If so, signaling controller 16 updates A(s)j to binary "0" (step 202). Meanwhile, the interworking unit is monitoring the signaling bit A(s)j at receive timing (step 300). Therefore, at time $t_1$, the updating of A(s)j=0 at signaling controller 16 is recognized by the interworking unit as a SETUP message, and flow proceeds from step 300 to step 301 to set up the local DCE 18 (FIG. 5). At time $t_2$, the interworking unit updates its transmit signaling bit A(i)j to "0" (steps 302, 303) and then, at time $t_3$, it updates A(i)j to "1" (steps 304, 305). Meanwhile, the signaling controller is monitoring the receive signaling bits A(i)x from the interworking unit to confirm that bit A(i)j is successively updated to "0" and "1" by the interworking unit (steps 203, 204). If so, the signaling controller recognizes the update to "1" as a SETUP COMPLETE message and returns an ACK message to the adapter 11 of the requesting mobile user (step 205), thus allowing ARQ synchronization to be established between the adapter 11 and the local DCE 18 and allowing DCE parameters to be subsequently set to the local DCE from the mobile user (FIG. 3).

If the parameters are set to the local DCE at time $t_4$, the interworking unit is informed of this fact (step 306) and updates its transmit signaling bit A(i)j to "0" at time $t_5$ (steps 307, 308). After returning the ACK message at step 205, signaling controller 16 is monitoring the receive signaling bit A(i)x at step 206 to detect when this bit has changed to "0". When this occurs, the signaling controller recognizes that a PROCEED-TO-SEND message is received from the interworking unit, and forwards an initial address message (IAM) to the PSTN (step 207).

Since a SETUP COMPLETE message is supplied from the interworking unit to the signaling controller, the latter is informed of the correct timing for returning an ACK message to the requesting mobile user, so that the ARQ sync establishment phase can be instantly started between the adapter and the local DCE as soon as the latter is activated. In the prior art, the signaling controller would have to wait a longer period of time to return an ACK message than would be necessary for the local DCE to be set ready to begin an ARQ sync establishment phase. In addition, the returning of a PROCEED-TO-SEND message from the interworking unit to the signal controller allows the latter to forward the initial address message (IAM) to the PSTN. It is seen that with these two response messages from the interworking unit to the signaling controller mobile users can send and receive computer data using a channel-associated signaling system.

As described previously with reference to FIG. 3, interactive operations between signaling controller 16 and interworking unit 17 do not occur until the signaling controller receives a DISCONNECT message from the mobile station 12. If this message is received at time $t_6$ (step 208), the signaling controller updates the transmit signaling bit A(s)j to "1" (steps 209, 210). The interworking unit recognizes the updating of signaling bit A(s)j to "1" as a DISCONNECT message (step 309) and proceeds to step 310 to release the local DCE 18 and updates its transmit signaling bit A(i)j to "1" at time $t_7$ (steps 311, 312). The signaling controller recognizes this change of signaling bit A(i) to "1" as a DISCONNECT COMPLETE message (step 211) and sends a DISCONNECT message to the PSTN (step 212).

Figure 6:
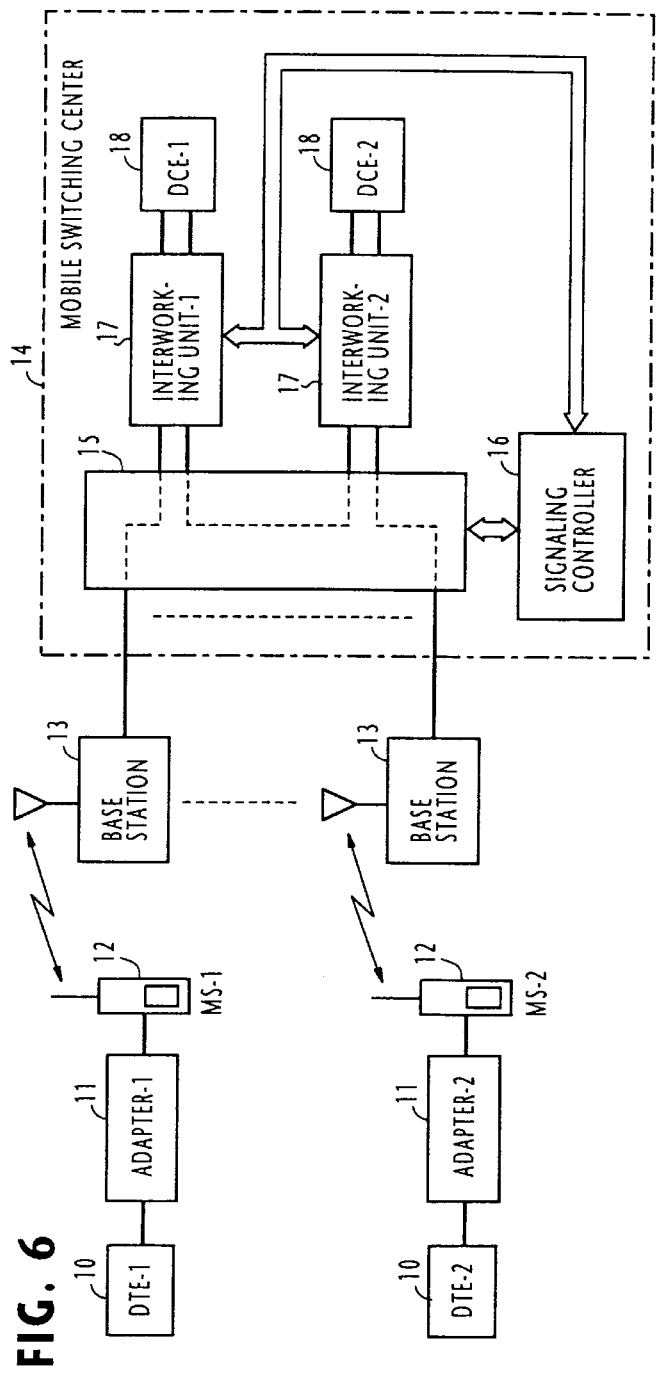
FIG. 6 is a block diagram of a data communication system of this invention between two mobile stations through a single mobile switching center.

Mobile data communication of this invention can also be provided between mobile end user systems through a mobile switching center as illustrated in FIG. 6. Two interworking units 17 are connected to the signaling controller 16 via first and second signaling channels, respectively, for exchanging single-bit signaling messages. Two DCEs are connected respectively to the interworking units.

Figure 7:
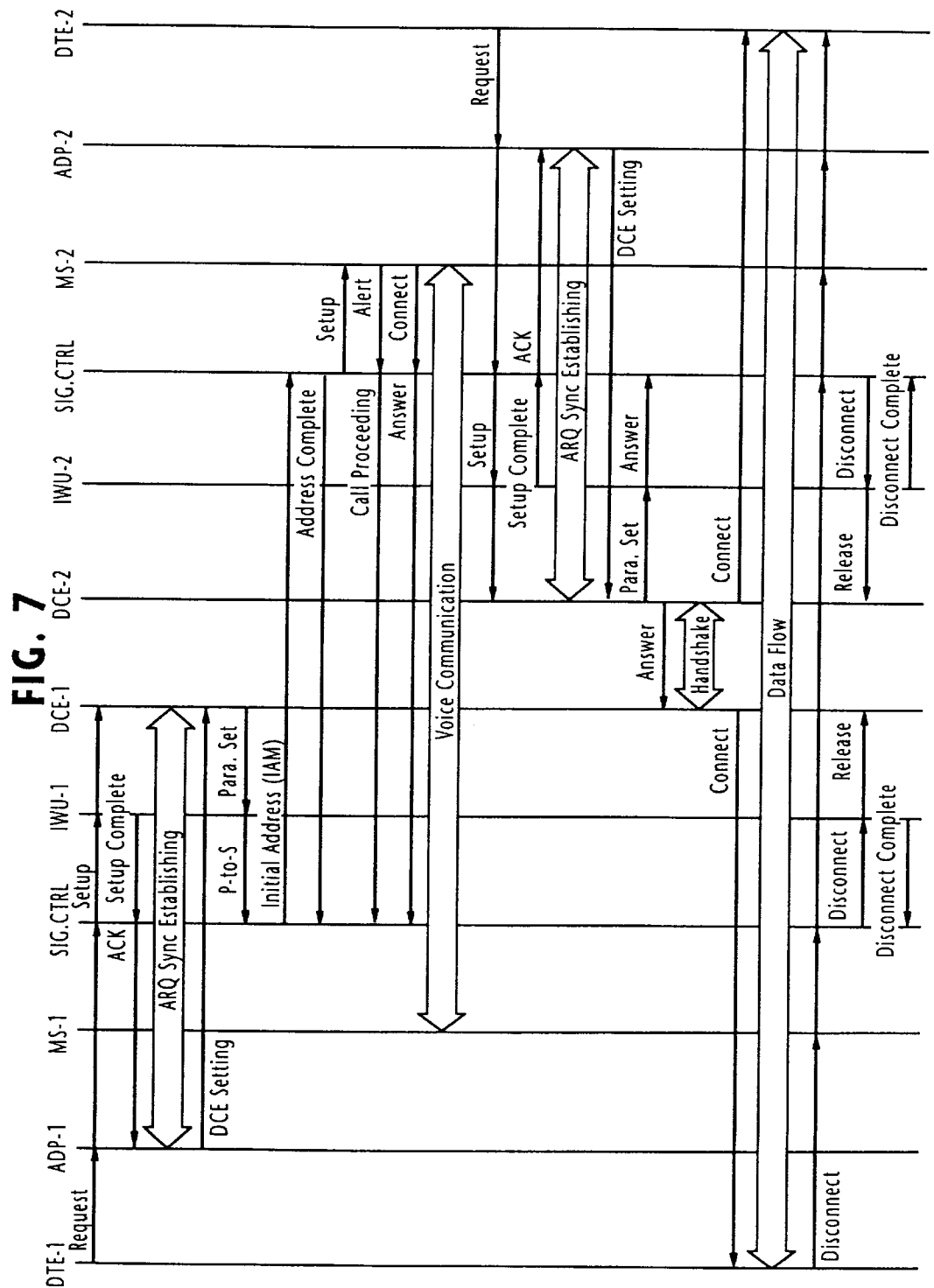
FIG. 7 is a sequence diagram illustrating a sequence of various messages transmitted through the system of FIG. 6.

The operation of the system proceeds as shown in FIG. 7 to establish data communication between DTE-1 and DT-2. The signaling controller 16 receives a REQUEST message from the DTE-1 and supplies a SETUP message to the interworking unit IWU-1. In response, the IWU-1 activates the first DCE-1 and returns a SETUP COMPLETE message to the signaling controller 16, resulting in the controller 16 returning an ACK message to the first adapter ADP-1. A first data channel is established between the ADP-1 and the DCE-1 so that necessary parameters are set into the DCE-1 in the same manner as described in relation to FIG. 3. Note that the first signaling channel is exclusively associated with the first data channel.

When the first data channel is established, a PROCEED-TO-SEND message is returned from the interworking unit IWU-1 to the signaling controller. In response, the signaling controller alerts the destination mobile station MS-2. After end-to-end voice communication, the DTE-2 sends a REQUEST message, which is received by the signaling controller. In response, the signaling controller supplies a SETUP message to the second interworking unit IWU-2, which responds thereto by returning SETUP COMPLETE message. An ACK message is then returned from the signaling controller to the adapter ADP-2.

A second data channel is established between the ADP-2 and the DCE-2 so that parameters are set into the DCE-2 from the ADP-2. Note that the second signaling channel is exclusively associated with the second data channel. An ANSWER message is then returned from the second interworking unit IWU-2 to the signaling controller. After a handshaking process between DCE-1 and DCE-2 is completed, a data flow begins between the two user end systems over the first and second data channels.

Figure 8:
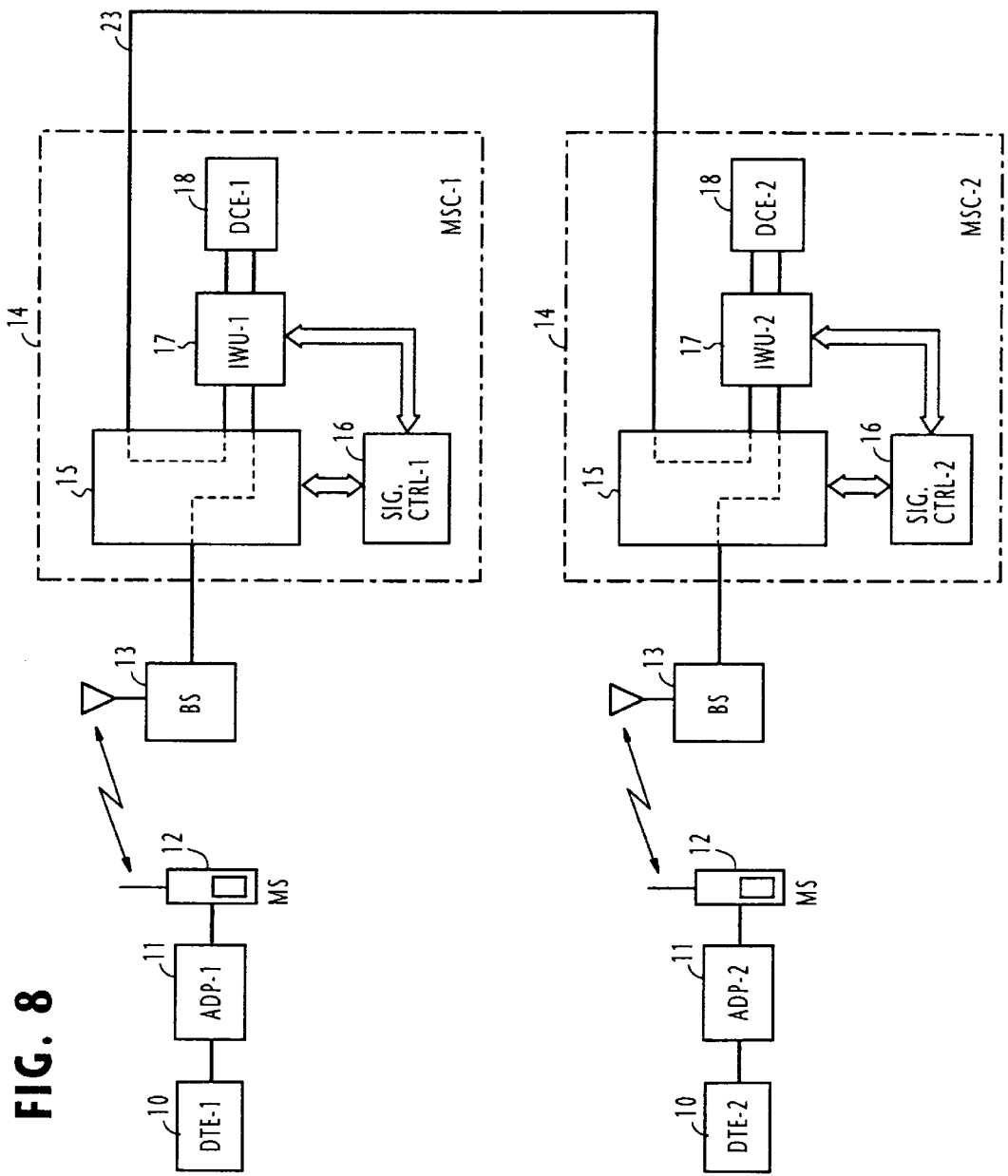
FIG. 8 is a block diagram of a data communication system of is invention between two mobile sections via two mobile stitching centers.

The two user end systems may be connected through different mobile switching centers as shown in FIG. 8 in which their respective interworking units 17 are directly interconnected by a transmission line 23 and their signaling controllers 16 are responsible for establishing data channels between the respective user end system and the associated DCE 18.

What is claimed is:

1. A data communication system comprising:
    a user end system;
    a controller;
    a local data circuit-terminating equipment (DCE); and
    an interworking unit for establishing communication between the local DCE and a destination DCE, the interworking unit being connected to the controller via a signal channel;
    said controller being responsive to a request message from said user end system for producing a single-bit setup message;
    said interworking unit being responsive to the setup message for setting up the local DCE and returning a single-bit first response message to the controller;
    said controller being responsive to said first response message for returning an acknowledgment message to said user end system to allow a data channel to be established between said user end system and said local DCE, said data channel being exclusively associated with said signaling channel;
    said interworking unit being further responsive to the establishment of the data channel for returning a single-bit second response message to the controller to allow said data channel to extend to said destination DCE.

2. A data communication system as claimed in claim 1, wherein said user end system is a mobile user end system, further comprising a cell-site station of a cellular communication network to which said mobile user end system establishes a radio link, wherein said controller is connected to said cell-site station to respond to said request message via said radio link.

3. A data communication system comprising:
    first and second user end systems;
    a controller;
    first and second data circuit-terminating equipment (DCE);
    first and second interworking units for establishing communication between the first DCE and the second DCE, the first and second interworking units being connected to the controller via first and second signaling channel, respectively;

said controller being responsive to a first request message from said first user end system for producing a single-bit first setup message;

said first interworking unit being responsive to the first setup message for setting up the first DCE and returning a single-bit first response message to the controller;

said controller being responsive to said first response message for returning an acknowledgment message to said first user end system to allow a first data channel to be established between said first user end system and said first DCE, said first data channel being exclusively associated with said first signaling channel;

said first interworking unit being first responsive to the establishment of the first data channel for returning a single-bit second response message to the controller for alerting the second user end system;

said controller being further responsive to a second request message from said second user end system for producing a single-bit second setup message;

said second interworking unit being responsive to the second setup message for setting up the second DCE and returning a single-bit third response message to the controller;

a said controller being responsive to the third response message for returning an acknowledgment message to said second user end system to allow a second data channel to be established between said second user end system and said second DCE, said second signaling channel being exclusively associated with the second data channel;

said second interworking unit being further responsive to the establishment of the second data channel for returning a single-bit fourth response message to the controller to allow data to flow between said first and second user end systems over said first and second data channels.

4. A data communication system as claimed in claim 3, wherein said first and second user end systems are first and second mobile user end systems, respectively, further comprising a first cell-site station of a cellular communication network to which said first mobile user end system establishes a first radio link, and a second cell-site station of said cellular communication network to which said second mobile user end system establishes a second radio link wherein said controller is connected to said first and second cell-site stations to respond to said first and second request messages via said first and second radio links, respectively.

5. A data communication system as claimed in claim 3, wherein said controller comprises a first signaling controller and a second signaling controller respectively connected to the first and second interworking units vis said first and second signaling channels, said first and second interworking units being interconnected by a transmission line.

6. A data communication method for a switching system comprising a controller, an interworking unit and a local data circuit-terminating equipment (DCE), said controller and the interworking unit being interconnected via a signaling channel for carrying a single-bit signaling message, said interworking unit establishing communication between the local DCE and a destination DCE, the method comprising the steps of:

a) receiving, at the controller, a request message from a user end system and supplying a single-bit setup message to said interworking unit;

b) receiving, at said interworking unit, said setup message and setting up said local DCE and returning a single-bit first response message to the controller;

c) receiving, at said controller, said first response message, and returning an acknowledgment message to said user end system;

d) establishing a data channel between said user end system and said local DCE, said signaling channel being exclusively associated with the data channel;

e) returning a single-bit second response message from the interworking unit to the controller; and f) receiving, at said controller, said second response message and extending said data channel from said controller to said destination DCE.

7. The method of claim 6, wherein said user end system is a mobile user end system, filter comprising the step of establishing a radio link between the mobile user end system and a cell-site station of a cellular communication network prior to the step (a).

8. A data communication method for a switching system comprising a controller, an interworking unit and a local data circuit-terminating equipment (DCE), sad controller and the interworking unit being interconnected via a signaling channel for carrying a single-bit signaling message, said interworking unit establishing communication between the local DCE and a destination DCE the method comprising the steps of:

a) receiving, at the controller, a first request message from a first user end system and supplying single-bit first setup message to said first interworking unit;

b) receiving, at the first interworking unit, said first setup message and setting up said first DCE and returning a single bit first response message to the controller;

c) receiving, at said controller said first response message, and returning an acknowledgment message to said first user end system;

d) establishing a first data channel between said first user end system and said first DCE, said first signaling channel being exclusively associated with the first data channel;

e) returning a single-bit second response message from the first interworking unit to the controller;

f) receiving, at said controller, said second response message and alerting a second end user system;

g) receiving, at the controller, a second request message from the second user end system ad supplying a single-bit second setup message to said second interworking unit;

h) receiving, it the second interworking unit, said second setup message and setting up said second DCE and returning a single-bit third response message to the controller;

i) receiving at said controller, said third response message, and returning an acknowledgment message to said second user end system;

j) establishing a second data channel between said second user end system and said second DCE, said second signaling channel being exclusively associated with the second data channel; and k) returning a single-bit fourth response message from the second interworking unit to the controller to allow data to flow between said first and second user end systems over the first and second data channels.

9. The method of claim 8, wherein said first and second user end systems are first and second mobile user end systems, respectively, further comprising the steps of establishing a first radio link between the first mobile user end system and first cell-site station of a cellular communication network and establishing a second radio link between the second mobile user end system and a second cell-site station of the cellular communication network prior to the step (a).

10. A data communication system comprising:
   a user end system;
   a controller;
   a local data circuit-terminating equipment (DCE); and
   an interworking unit for establishing communication between the local DCE and a destination DCE, the interworking unit being connected to the controller via a signaling channel;
   said controller being responsive to a request message from said user end system for producing a single-bit setup message;
   said interworking unit being responsive to the setup message for setting up the local DCE and returning a single-bit first response message to the controller by presenting to the controller a transition of states from a first logic state to a second logic state followed by another transition of states from the second logic state to the first logic state;
   said controller being responsive to said first response message for returning an acknowledgment message to said user end system to allow a data channel to be established between said user end system and said local DCE, said data channel being exclusively associated with said signaling channel;
   said interworking unit being further responsive to the establishment of the data channel for returning a single-bit second response message to the controller by presenting to the controller a transition of states from the first logic state to the second logic state to allow said data channel to extend to said destination DCE.

11. A data communication system as claimed in claim 10, wherein said user end system is a mobile user end system, further comprising a cell-site station of a cellular communication network to which said mobile user end system establishes a radio link, wherein said controller is connected to said cell-site station to respond to said request message via said radio link.

12. A data communication system comprising:
   first and second user end systems;
   a controller;
   first and second data circuit-terminating equipment (DCE); and
   first and second interworking units for establishing communication between the first DCE and the second DCE, the first and second interworking units being connected to the controller via first and second signaling channels, respectively;
   said controller being responsive to a first request message from said first user end system for producing a single-bit first setup message;
   said first interworking unit being responsive to the first setup message for setting up the first DCE and returning a single-bit first response message to the controller by presenting to said controller a transition of states from a first logic state to a second logic state followed by another transition of states from the second logic state to the first logic state;
   said controller being responsive to said first response message for returning an acknowledgment message to said first user end system to allow a first data channel to be established between said first user end system and said first DCE, said first data channel being exclusively associated with said first signaling channel;
   said first interworking unit being responsive to the establishment of the first data channel for returning a single-bit second response message to the controller by presenting to the controller a transition of states from the first logic state to the second logic state for alerting the second user end system;
   said controller being further responsive to a second request message from said second user end system for producing a single-bit second setup message;
   said second interworking unit being responsive to the second setup message for setting up the second DCE and returning a single-bit third response message to the controller by presenting to said controller a transition of states from a first logic state to a second logic state followed by another transition of states from the second logic state to the first logic state;
   said controller being responsive to the third response message for returning an acknowledgment message to said second user end system to allow a second data channel to be established between said second user end system and said second DCE, said second signaling channel being exclusively associated with the second data channel;
   said second interworking unit being further responsive to the establishment of the second data channel for returning a single-bit fourth response message to the controller by presenting to the controller a transition of states from the first logic state to the second logic state to allow data to flow between said first and second user end systems over said first and second data channels.

13. A data communication system as claimed in claim 12, wherein said first and second user end systems are first and second mobile user end systems, respectively, further comprising a first cell-site station of a cellular communication network to which said first mobile user end system establishes a first radio link and a second cell-site station of said cellular communication network to which said second mobile user end system establishes a second radio link, wherein said controller is connected to said first and second cell-site stations to respond to said first and second request messages via said first and second radio links, respectively.

14. A data communication system as claimed in claim 12, wherein said controller comprises a first signaling controller and a second signaling controller respectively connected to the first and second interworking units via said first and second signaling channels, said first and second interworking units being interconnected by a transmission line.

15. A data communication method for a switching system comprising a controller, an interworking unit and a local data circuit terminating equipment (DCE), said controller and the interworking unit being interconnected via a signaling channel for carrying a single-bit signaling message, said interworking unit establishing communication between the local DCE and a destination DCE, the method comprising the steps of:
   a) receiving, at the controller, a request message from a user end system and supplying a single-bit setup message to said interworking unit;
   b) receiving, at said interworking unit, said setup message and setting up said local DCE and returning a single-bit first response message to the controller by presenting to the controller a transition of states from a first logic state to a second logic state followed by another transition of states from the second logic state to the first logic state;

c) receiving, at said controller, said first response message, and returning an acknowledgment message to said user end system;

d) establishing a data channel between said user end system and said local DCE, said signaling channel being exclusively associated with the data channel;

e) returning a single-bit second response message from the interworking unit to the controller by presenting to the controller a transition of states from the first logic state to the second logic state; and f) receiving, at said controller, said second response message and extending said data channel from said controller to said destination DCE.

16. The method of claim 15, wherein said user end system is a mobile user end system, further comprising the step of establishing a radio link between the mobile user end system and a cell-site station of a cellular communication network prior to the step (a).

17. A data communication method for a switching system comprising a controller, an interworking unit and a local data circuit terminating equipment (DCE), said controller and the interworking unit being interconnected via a signaling channel for carrying a single-bit signaling message, said interworking unit establishing communication between the local DCE and a destination DCE, the method comprising the steps of:

a) receiving, at the controller, a first request message from a first user end system and supplying a single-bit first setup message to said first interworking unit;

b) receiving, at the first interworking unit, said first setup message and setting up said first DCE and returning a single-bit first response message to the controller by presenting to the controller a transition of states from a first logic state to a second logic state followed by another transition of states from the second logic state to the first logic state;

c) receiving, at said controller, said first response message, and returning an acknowledgment message to said first user end system;

d) establishing a first data channel between said first user end system and said first DCE, said first signaling channel being exclusively associated with the first data channel;

e) returning a single-bit second response message from the first interworking unit to the controller by presenting to the controller a transition of states from the first logic state to the second logic state;

f) receiving, at said controller, said second response message and alerting a second end user system;

g) receiving, at the controller, a second request message from the second user end system and supplying a single-bit second setup message to said second interworking unit;

h) receiving, at the second interworking unit, said second setup message and setting up said second DCE and returning a single-bit third response message to the controller by presenting to the controller a transition of states from a first logic state to a second logic state followed by another transition of states from the second logic state to the first logic state;

i) receiving, at said controller, said third response message, and returning an acknowledgment message to said second user end system;

j) establishing a second data channel between said second user end system and said second DCE, said second signaling channel being exclusively associated with the second data channel; and k) returning a single-bit fourth response message from the second interworking unit to the controller by presenting to the controller a transition of states from the first logic state to the second logic state to allow data to flow between said first and second user end systems over the first and second data channels.

18. The method of claim 17, wherein said first and second user end systems are first and second mobile user end systems, respectively, further comprising the steps of establishing a first radio link between the first mobile user end system and a first cell-site station of a cellular communication network and establishing a second radio link between the second mobile user end system and a second cell-site station of the cellular communication network prior to the step (a).

* * * * *